3,470,262
DEHYDROGENATION PROCESS
Glenn O. Michaels, South Holland, and John Mooi, Homewood, Ill., assignors to Sinclair Research, Inc., New York, N.Y., a corporation of Delaware
No Drawing. Filed May 16, 1966, Ser. No. 550,176
Int. Cl. C07c 11/12, 5/18
U.S. Cl. 260—680   20 Claims

ABSTRACT OF THE DISCLOSURE

Paraffin or mono-olefin hydrocarbons of 4 to 5 carbon atoms are effectively dehydrogenated in the vapor phase at temperatures of about 900 to 1200° F. while in contact with a catalyst comprising about 0.01 to 1 weight percent of a platinum group metal, about 5 to 50 weight percent $Cr_2O_3$, about 1 to 50 weight percent ZnO, about 0.1 to 2 weight percent alkali metal oxide, and at least about 30 weight percent activated alumina. The zinc oxide and alumina can be combined in the form of spinel.

---

This invention relates to the dehydrogenation of hydrocarbons and more particularly to the dehydrogenation of hydrocarbons of 4 to 5 carbon atoms in the presence of a novel catalyst.

Chromia-alumina catalysts have been used commercially for the dehydrogenation of paraffinic and olefinic compounds to form olefins and/or diolefins. Quite frequently a process will use a catalyst containing from 10 to 20% $Cr_2O_3$ carried on a high surface area support such as activated alumina. Commonly, small amounts of alkali metal oxides are added to neutralize the acid sites on the catalyst to minimize cracking and isomerization reactions. These catalysts have been used in such processes as the production of butenes and butadiene from n-butane, isoprene and isoamylene from isopentane, styrene from ethyl benzene and a number of similar dehydrogenation reactions. The catalysts, however, exhibit inadequate activity and selectivity for the dehydrogenation of lower aliphatic hydrocarbons of 4 to 5 carbon atoms.

It has now been discovered that a composite containing a platinum group metal, chromia, zinc oxide, alumina and an alkali metal oxide shows excellent catalytic activity and selectivity in the vapor phase dehydrogenation of lower aliphatic hydrocarbons of 4 to 5 carbon atoms. All constituents of the catalyst cooperate to produce the improved catalytic system of the present invention. The activity and selectivity of the new catalysts are far superior to similar catalysts containing only one of platinum or chromia. Thus the vapor phase dehydrogenation of hydrocarbons in the presence of the novel catalyst of the invention considerably minimizes isomerization of all types, i.e., skeletal isomerization and double bond migration, so that higher yields and selectivities of the desired product are obtained.

The catalyst of the present invention contains $Cr_2O_3$, ZnO, alkali metal oxide, alumina, and a small effective amount of a platinum group metal component. The amount of $Cr_2O_3$ can vary widely and will usually fall in the range of about 5 to 50% by weight, preferably about 10 to 20% by weight of the catalyst. The amount of ZnO, whether in oxide form or as a spinel, can also vary widely, say from about 1 to 50%, preferably about 5 to 15%, by weight of the catalyst. The amount of alkali metal oxide present in the catalyst is important, as too little alkali metal oxide does not prevent isomerization and too much alkali metal oxide causes increased coke yields and lower activity. Acceptable results are usually obtained when about 0.1 to 2 percent, preferably about 0.4 to 1.5 percent, by weight alkali metal as the metal oxide is present in the catalyst. It should be appreciated, however, that the most advantageous level of alkali metal oxide may vary from catalyst to catalyst and for the best results should be determined in every specific case. For example when a zinc aluminate spinel is employed, the most advantageous results have been obtained with about 0.4 to 0.6 percent by weight alkali metal whereas when the ZnO is provided by impregnation of an essentially alumina support usually about 0.8 to 2 percent by weight alkali metal gives the best results. The preferred alkali metal oxide is sodium oxide. Other alkali metal oxides, i.e., the oxides of potassium, cesium, and rubidium can also be used. The amount of platinum group metal present in the catalyst to achieve the improved activity and selectivity of the present invention is generally from about 0.01% to 1%, by weight, preferably about 0.02 to 0.2% by weight of the catalyst. The essential balance of the catalyst can be activated alumina, which may be present as the oxide, in zinc aluminate spinel form or as mixtures of the oxides and spinel forms. The catalyst may contain minor amounts of other ingredients provided they are not unduly deleterious to the desired result.

In accordance with the process of the present invention the hydrocarbon to be dehydrogenated is contacted under dehydrogenation conditions with the novel catalyst. The dehydrogenation process is conducted in the vapor phase under an elevated temperature, for instance, about 900 to 1200° F., preferably about 1000 to 1150° F., and usually a hydrocarbon pressure of up to about 2 atmospheres or more is employed. Generally, increased selectivities are obtained at hydrocarbon pressures below atmospheric, say down to about 0.05 atmosphere or below with a hydrocarbon pressure of about 0.1 to 0.3 atmosphere being preferred for economic reasons. An inert diluent or vacuum can be employed to reduce the hydrocarbon partial pressure of the hydrocarbon feed. Various essentially inert gaseous diluents can be employed but it is preferred to use nitrogen, hydrogen, or methane. The inert gas is usually present in an amount of about 0.5 to 50 moles, preferably about 5 to 25 moles, per mole of hydrocarbon feed. The contact time or weight hourly space velocity may vary depending on the temperature and pressure employed, but will generally range from about 0.05 to 5, preferably 0.10 to 2.0 WHSV.

The alumina component of the catalyst composition is the catalyst base, and preferably the major component and usually at least about 30 weight percent of the catalyst. Activated or gamma-family aluminas can be employed such as those derived by calcination of amorphous hydrous alumina, alumina monohydrate, alumina trihydrate or their mixtures, at elevated temperatures of, for instance, about 750 to 1500° F., preferably about 850 to 1400° F. Advantageously, the alumina precursor may be a mixture predominating in, for instance, about 65 to 95% by weight, in one or more of the alumina trihydrates: bayerite, nordstrandite or gibbsite, and about 5 to 35% by weight alumina monohydrate (boehmite), amorphous alumina or their mixtures. Catalyst bases of this type are disclosed in U.S. Patents Nos. 2,838,444 and 2,838,445. The alumina base or catalyst may also contain small amounts of other materials, e.g. solid oxides.

The ZnO component of the catalyst can be provided as such or along with the alumina as part of a ZnO-containing alumina base as, for example, a zinc aluminate spinel. A preferred method for producing a zinc spinel is described in Example I below.

Impregnation of the alumina base with the catalytically-active metal components, i.e., chromium, alkali metal, zinc and platinum group metal, can be by various methods whether the base be in oxide or spinel form. For instance, the base can be mixed with an aqueous solution of a water-soluble salt of the catalytically-active components of the invention to absorb all or part of the solution in the support which is then dried and calcined, for instance at the temperatures noted above, to give an active catalyst. Alternatively, the active components can be precipitated on the support through neutralization of a slurry of the support and water-soluble compounds of the catalytically-active metals and then drying and calcining. Calcining activates the catalyst and, if not already present as the oxides, may convert the catalytically-active metal components to their oxide form. The impregnation with the catalytically-active components can be done separately or simultaneously.

If desired, the alumina base can be ground before addition of the catalytic metals and the resulting material formed, if desired, into larger particles, impregnated and dried before effecting the calcination which gives the final catalyst. Alternatively, the base particles can be directly impregnated, dried and calcined; or directly impregnated, ground and formed into shaped particles by tabletting or extrusion and then recalcined. It is preferred to calcine the alumina or ZnO-containing alumina prior to addition of the catalytically active compoents. After the catalytically active components are added to the base, the resulting catalyst compositions can be activated by drying and calcination, for instance, at the temperatures noted above.

The hydrocarbon feeds of the present invention are generally aliphatic hydrocarbons of 4 to 5 carbon atoms. Feeds of longer hydrocarbon chains tend to undergo cracking to lighter materials. The feeds can be unsaturated but the preferred feeds are the normal and branched chain paraffins, including the cyclic paraffins such as cyclopentane. Among the unsaturated feeds which can be used are the mono-olefins of the $C_4$ to $C_5$ range which may undergo dehydrogenation to yield dienes.

The invention will be further illustrated by the following examples which are not to be considered limiting.

EXAMPLE I

A zinc aluminate spinel was prepared as follows: 453 g. of sodium aluminate (42.9% $Al_2O_3$, 30.6% $Na_2O$) was disolved in deionized water, filtered, and diluted to 1 liter. 568 g. of $Zn(NO_3)_2 \cdot 6H_2O$ was dissolved in deionized water, 45 ml. of concentrated $HNO_3$ was added, and the solution was diluted to 1 liter. The two solutions were run simultaneously into 2 l. of deionized water stirred rapidly in a 3 gal. polyethylene container. The solutions were added at equal rates such that the addition required 20 min. When the addition was about ¼ complete 3 liters more deionized water were added to thin the precipitate. The precipitate was stirred for 1 hr. after the addition was complete and then filtered. The cake was washed repeatedly by slurrying in 4 liters of ammonium carbonate solution (1 g./liter), and filtering. Six washes were required before a negative sodium test was obtained on the filterate. The washed cake was then dried in a forced-air drying oven at about 230° F. and ground with a mortar and pestle to pass 20 mesh. The powder was mixed with 4% HM Sterotex and tabletted ⅛ in, diameter x ⅛6 in. length using a Stokes 16 punch tablet press. The tablets were calcined in a muffle furnace programmed to heat to 1050° F. at about 200° F./hr. and then maintain 1050° F. for 3 hrs. Analysis of the calcined material showed 2.08% volatile at 1000° C., 29.9% ZnO, and 70.0% $Al_2O_3$ (Spl. No. 900–5085).

To illustrate the importance of the presence of both platinum and chomium oxide in the catalyst compositions of the present invention, three different catalyst systems were prepared, and their relative activities and selectivities compared in Example V. The catalyst system of Example II contains $Cr_2O$; the catalyst of Example III contains platinum; and the catalyst of Example IV contains both platinum and $Cr_2O_3$.

EXAMPLE II 1000 grams of alumina trihydrate (Bayerite), 90 g. of zinc oxide, 3.5 g. of starch and 3.5 g. of methyl cellulose were mixed dry in a Simpson Intensive Mixer. A solution of 283 g. of $Al(NO_3)_3 \cdot 9H_2O$ in 170 ml. of deionized water was added to the mix in small portions with short periods of mixing between additions. Mixing was continued for about ¾ hr. after the final addition. The resulting dough was extruded through a dieplate with ⅛6 in. diameter openings, with a Welding Engineer's twin-worm extruder. The extrudate was dried in a forced-air drying oven, cooled, and broken to less than ⅜ in. lengths. Fines were removed through a 14 mesh screen. The extrudate was then calcined in a muffle furnace programmed to heat from 270 to 600° F. at 30° F./hr., from 600–1050° F. at about 112° F./hr. and then maintained at 1050° F. for three hours.

192 g. of the calcined extrudate was vacuum impregnated with a solution of 7.9 g. of $NaHCO_3$ in deionized water to make 115 ml. The extrudate was held in contact with the solution for about ½ hr. and was then transferred to a 12 x 18 in. Pyrex tray and dried in a forced-air drying oven at 230° F. The oven-dry catalyst was calcined in a muffle furnace programmed to heat from 230° F. to 900° F. at about 200° F./hr. and then maintained at 900° F. for 3 hrs. The extrudate was cooled and then further vacuum impregnated with a solution of 62.3 g. $CrO_3$ and 1.9 g. NaOH in deionized water to make 115 ml. The impregnated extrudate was transferred to a 12 x 18 in. Pyrex tray and dried in a forced-air drying oven at 230° F. The catalyst was stirred frequently during the first ½ hr. of the 16 hr. drying period. The oven-dry catalyst was then calcined in a tube furnace at 1400° F. for 5 hrs. in an atmosphere of flowing air saturated with water at about 140° F. and then for 1 hr. in flowing dry air. Recovery 235 g. Sample No. 900–5117.

*Analysis.*—0.41% volatile at 1000° C., 17.8% $Cr_2O_3$, 0.95% Na, 9.69% ZnO.

EXAMPLE III 200 g. of the calcined ZnO-$Al_2O_3$ extrudate as used in Example II was vacuum impregnated with a solution containing 0.120 g. Pt (introduced as $H_2PtCl_6$), 8.9 g. NaOH, and sufficient deionized water to make 300 ml. The extrudate was held in contact with the solution for 4 days, filtered on a vacuum filter, and dried in a forced-air drying oven at 230° F. The oven-dry catalyst was calcined in a muffle furnace, programmed to heat from 230° F. to 1050° F. at about 200° F./hr. and then maintained at 1050° F. for 3 hrs. Sample No. 900–5157.

*Analysis.*—1.66% volatile at 1000° C., 0.012% Pt, 1.62% Na.

EXAMPLE IV 192 g. of a calcined ZnO-$Al_2O_3$ extrudate prepared by the same method as was used for the extrudate of Example II was vacuum impregnated with a solution of 62.3 g. $CrO_3$, 1.9 g. NaOH, and 21 ml. con. $NH_4OH$ in deionized water to make 125 ml. The extrudate was held in contact with the solution for 1½ hrs. and then transferred to a 12 x 18 in. Pyrex tray and placed in a forced-air drying oven at 230° F. The oven-dry catalyst was calcined in a tube furnace at 1400° F. for 5 hrs. in an atmosphere of flowing air saturated with water at about 140° F., and then for 1 hr. in flowing dry air. The calcined catalyst was then further vacuum impregnated with a solution containing 0.131 g. Pt (introduced as $H_2PtCl_6$), 2.9 g. NaOH, and deionized water to make 300 ml. The catalyst was held in contact with the solution for about 16 hrs., filtered on a vacuum filter, and dried in a forced-air drying-oven at 230° F. The oven-dry catalyst was calcined in a muffle furnace programmed to heat from 230° F. to 1050° F. at about 200° F./hr. and then maintained at 1050° F. for 3 hrs. Recovery 228 g. Sample No. 900-5155.

Analysis.—0.79% volatile at 1000° C., 16.4% $Cr_2O_3$, 0.848% Na, 8.55% ZnO, 0.025% Pt.

EXAMPLE V

Portions of the catalysts described in Examples II, III and IV were charged to a 1 inch Universal type reactor and tested for the conversion of n-butane to butenes and butadiene. The catalysts were raised to operating temperature in a slow stream of nitrogen. The feed was introduced to the reactor without any further pretreat of the catalyst. After each run, the reactor was purged 15 minutes with $N_2$ and the coke burned off the catalyst with air-$N_2$ mixture. Pure grade n-butane was used as the feed. Data on the three catalysts are summarized in Table I.

The data in Table II indicate that the $P-CR_2O_3-ZnO-Al_2O_3-Na^+$ catalyst was more active than the commercial dehydrogenation catalyst, more selective to isoprene, and, in addition, has a more favorable isoprene to piperylene ratio and a more favorable isoprene to isoamylene ratio. The fact that this catalyst was selective for the dehydrogenation of both n-butane and isopentane makes the catalyst especially useful when a mixed $C_4$-$C_5$ feed is used.

We claim:
1. A process for the dehydrogenation of a paraffin or mono-olefin hydrocarbon of 4 to 5 carbon atoms which comprises contacting said hydrocarbon under vapor phase dehydrogenation conditions, including a temperature of about 900 to 1200° F., with a catalyst composition com-

TABLE I.—Dehydrogenation of n-Butane

| Support | $ZnO-Al_2O_3-Na^+$ | | | | | | | |
|---|---|---|---|---|---|---|---|---|
| Promoter | $Pt-Cr_2O_3$ | | | | | $Cr_2O_3$ | | Pt |
| Run No | 73-A | 73-B | 73-C | 73-D | 73-E | 74-A | 74-C | 75-A |
| Conditions: | | | | | | | | |
| Temperature, °F., ave | 994 | 1,009 | 1,004 | 1,051 | 1,054 | 1,014 | 1,006 | 1,032 |
| WHSV | 1.55 | 1.11 | 1.07 | 1.02 | .81 | 1.01 | 1.00 | 1.24 |
| Inlet pressure, mm. of Hg | 257 | 209 | 210 | 217 | 212 | 214 | 206 | 187 |
| Length of run, minutes | 15 | 15 | 15 | 15 | 15 | 15 | 15 | 15 |
| Conversion of n-butane, wt. percent | 46.7 | 56.7 | 51.8 | 65.4 | 69.6 | 47.2 | 46.0 | ~0 |
| Selectivity to butenes, mole percent | 78.4 | 73.6 | 74.6 | 63.7 | 62.0 | 55.2 | 65.3 | |
| Selectivity to butadiene, mole percent | 14.2 | 17.2 | 17.8 | 19.6 | 20.5 | 13.7 | 12.6 | |
| Total | 92.6 | 90.8 | 92.4 | 83.3 | 82.5 | 68.9 | 78.0 | |
| Butadiene/butene ratio | .181 | .233 | .238 | .308 | .331 | .249 | .194 | |
| Coke on catalyst, wt, percent | 1.12 | 1.95 | 1.22 | 4.40 | 4.98 | 7.57 | 5.11 | |

The data in Table I illustrate the marked improvement in selectivity and activity of the catalyst containing both Pt and $Cr_2O_3$ over the catalysts containing $Cr_2O_3$ or Pt. The $ZnO-Al_2O_3-Na^+$ catalyst promoted with Pt alone was almost completely inactive. The catalyst promoted with Pt and $Cr_2O_3$ was at least 50% more active than the catalyst promoted with $Cr_2O_3$ alone. Comparison of Run 73-A with Run 74-A, for example, shows 92.6% selectivity to butenes plus butadiene for the $Pt-Cr_2O_3$ catalyst compared with 68.9% selectivity for the $Cr_2O_3$ catalyst (both at about the 47% conversion level). Examination of the data also indicates that Pt added to the catalyst gives a reduction in the amount of coke produced on the catalyst.

EXAMPLE VI

A portion of the $Pt-Cr_2O_3-ZnO-Al_2O_3-Na^+$ catalyst of Table I was charged to a 1" Universal type reactor and used for the conversion of iso-pentane to isoprene. A sample of a commercially available dehydrogenation catalyst was charged to a 1" Universal type reactor and evaluated in the same manner. A comparison of the two catalysts for the dehydrogenation of isopentane is shown in Table II.

prising about 0.01 to 1 percent by weight of a platinum group metal, about 5 to 50 percent by weight of chromia, about 1 to 50 percent by weight of ZnO, about 0.1 to 2 percent by weight of alkali metal as alkali metal oxide, and at least about 30 percent by weight of $Al_2O_3$, said ZnO and $Al_2O_3$ being supplied to the composition by members selected from the group consisting of zinc oxide, activated alumina, zinc aluminate spinel and mixtures of the foregoing.

2. The process of claim 1 wherein the $Al_2O_3$ is a major component of the catalyst composition.

3. The process of claim 2 wherein the ZnO is supplied to the catalyst composition by zinc oxide.

4. The process of claim 3 wherein the alkali metal is sodium.

5. The process of claim 4 wherein the platinum group metal is platinum.

6. The process of claim 5 wherein the hydrocarbon is selected from the group consisting of n-butane and isopentane.

7. The process of claim 2 wherein the ZnO is supplied to the catalyst composition by zinc aluminate spinel.

8. The process of claim 7 wherein the alkali metal is sodium.

TABLE II

| | $Pt-Cr_2O_3-ZnO-Al_2O_3-Na^+$ | | Commercial catalyst | | |
|---|---|---|---|---|---|
| Run No | 76-A | 76-B [1] | 80-A | 80-B | 80-C |
| Conditions: | | | | | |
| Ave. Temperature, °F | 1,123 | 1,003 | 1,010 | 1,111 | 1,111 |
| WHSV | .95 | 1.09 | 1.07 | 1.50 | 0.55 |
| Inlet pressure, mm. of Hg | 175 | 169 | 185 | 184 | 152 |
| Length of run, minutes | 15 | 15 | 15 | 15 | 15 |
| Conversion of isopentane, wt. percent | 59.0 | 48.4 | 38.4 | 34.5 | 54.8 |
| Sel. to isoamylenes, mole percent | 53.5 | 59.5 | 60.1 | 62.1 | 54.3 |
| Sel. to isoprene, mole percent | 28.3 | 33.1 | 21.1 | 23.0 | 21.0 |
| Total | 81.8 | 92.6 | 81.2 | 85.1 | 75.3 |
| Isoprene/piperylene ratio | 9.55 | 8.20 | 3.29 | 4.76 | 2.92 |
| Isoprene/isoamylene ratio | .529 | .556 | .352 | .448 | .386 |

[1] Tech. i-$c_5$.

9. The process of claim 8 wherein the platinum group metal is platinum.

10. The process of claim 9 wherein the hydrocarbon is selected from the group consisting of n-butane and isopentane.

11. The process of claim 1 wherein the platinum group metal is present in the catalyst composition in amounts of about 0.02 to 0.2 weight percent, the chromia is present in amounts of about 10 to 20 weight percent, the ZnO is present in amounts of about 5 to 15 weight percent, the alkali metal is present in amounts of about 0.4 to 1.5 weight percent and the $Al_2O_3$ makes up the essential balance of the composition.

12. The process of claim 11 wherein the platinum group metal is platinum.

13. The process of claim 12 wherein the ZnO is supplied to the catalyst composition by zinc oxide.

14. The process of claim 13 wherein the alkali metal is sodium.

15. The process of claim 14 wherein the hydrocarbon is n-butane.

16. The process of claim 15 wherein the hydrocarbon is isopentane.

17. The process of claim 12 wherein the ZnO is supplied to the catalyst composition by zinc aluminate spinel.

18. The process of claim 17 wherein the alkali metal is sodium.

19. The process of claim 18 wherein the hydrocarbon is n-butane.

20. The process of claim 18 wherein the hydrocarbon is isopentane.

References Cited

UNITED STATES PATENTS

| | | | |
|---|---|---|---|
| 2,317,683 | 4/1943 | Greensfelder | 252—465 X |
| 2,447,017 | 8/1948 | Kearby | 252—465 |
| 2,754,345 | 7/1956 | Kirshenbaum | 260—683.3 |
| 2,758,062 | 8/1956 | Arundale et al. | 252—465 X |
| 2,796,410 | 6/1957 | Strecker et al. | 252—465 |

PAUL M. COUGHLAN, Jr., Primary Examiner

U.S. Cl. X.R.

252—465; 260—683.3